(12) United States Patent
Tong et al.

(10) Patent No.: US 8,090,713 B2
(45) Date of Patent: Jan. 3, 2012

(54) METHODS AND SYSTEMS FOR IMPROVING A SEARCH RANKING USING POPULATION INFORMATION

(75) Inventors: Simon Tong, Mountain View, CA (US); Mark Pearson, San Mateo, CA (US)

(73) Assignee: Google Inc., Mountain View, CA (US)

(*) Notice: Subject to any disclaimer, the term of this patent is extended or adjusted under 35 U.S.C. 154(b) by 410 days.

(21) Appl. No.: 12/273,449

(22) Filed: Nov. 18, 2008

(65) Prior Publication Data

US 2011/0238643 A1    Sep. 29, 2011

Related U.S. Application Data

(63) Continuation of application No. 10/661,741, filed on Sep. 12, 2003, now Pat. No. 7,454,417.

(51) Int. Cl.
    *G06F 17/30*    (2006.01)
(52) U.S. Cl. .................... 707/723; 707/769; 709/203
(58) Field of Classification Search .................. 707/723, 707/769; 709/203
    See application file for complete search history.

(56) References Cited

U.S. PATENT DOCUMENTS

| | | | |
|---|---|---|---|
| 5,265,065 A | 11/1993 | Turtle | |
| 5,920,854 A | 7/1999 | Kirsch et al. | |
| 6,006,222 A | 12/1999 | Culliss | |
| 6,014,665 A | 1/2000 | Culliss | |
| 6,067,565 A | 5/2000 | Horvitz | |
| 6,078,916 A | 6/2000 | Culliss | |
| 6,134,532 A | 10/2000 | Lazarus et al. | |
| 6,182,068 B1 | 1/2001 | Culliss | |
| 6,182,559 B1 | 2/2001 | Chiang | |
| 6,285,999 B1 | 9/2001 | Page | |
| 6,327,590 B1 | 12/2001 | Chidlovskii et al. | |
| 6,341,283 B1 | 1/2002 | Yamakawa et al. | |
| 6,353,849 B1 | 3/2002 | Linsk | |
| 6,363,378 B1 | 3/2002 | Conklin et al. | |
| 6,374,237 B1 | 4/2002 | Reese | |
| 6,480,843 B2 | 11/2002 | Li | |
| 6,490,575 B1 | 12/2002 | Berstis | |
| 6,526,440 B1 | 2/2003 | Bharat | |
| 6,529,903 B2 | 3/2003 | Smith et al. | |

(Continued)

FOREIGN PATENT DOCUMENTS

WO    WO01/67297    9/2001

OTHER PUBLICATIONS

Boyan, J., 'A Machine Learning Architecture for Optimizing Web Search Engines', School of Computer Science, Carnegie Mellon University, May 10, 1996.

(Continued)

*Primary Examiner* — Cheryl Lewis
(74) *Attorney, Agent, or Firm* — Fish & Richardson P.C.

(57) ABSTRACT

Systems and methods that improve search rankings for a search query by using data associated with queries related to the search query are described. In one aspect, a search query is received, a population associated with the search query is determined, an article (such as a webpage) associated with the search query is determined, and a ranking score for the article based at least in part on data associated with the population is determined. Algorithms and types of data associated with a population useful in carrying out such systems and methods are described.

43 Claims, 3 Drawing Sheets

U.S. PATENT DOCUMENTS

| | | | |
|---|---|---|---|
| 6,539,377 | B1 | 3/2003 | Cullis |
| 6,567,103 | B1 | 5/2003 | Chaudhry |
| 6,615,209 | B1 | 9/2003 | Gomes et al. |
| 6,658,423 | B1 | 12/2003 | Pugh et al. |
| 6,671,681 | B1 | 12/2003 | Emens et al. |
| 6,678,681 | B1 | 1/2004 | Brin |
| 6,725,259 | B1 | 4/2004 | Bharat |
| 6,738,764 | B2 | 5/2004 | Mao et al. |
| 6,754,873 | B1 | 6/2004 | Law et al. |
| 6,853,993 | B2 | 2/2005 | Ortega et al. |
| 6,877,002 | B2 | 4/2005 | Prince |
| 6,928,392 | B2 | 8/2005 | Nickerson et al. |
| 6,990,453 | B2 | 1/2006 | Wang et al. |
| 7,454,417 | B2 * | 11/2008 | Tong et al. ............... 1/1 |
| 7,613,708 | B2 * | 11/2009 | Rieffanaugh, Jr. ............ 1/1 |
| 2002/0034292 | A1 | 3/2002 | Tuoriniemi et al. |
| 2002/0042791 | A1 | 4/2002 | Smith et al. |
| 2002/0049752 | A1 | 4/2002 | Bowman et al. |
| 2002/0078045 | A1 | 6/2002 | Dutta |
| 2002/0103790 | A1 | 8/2002 | Wang et al. |
| 2002/0123988 | A1 | 9/2002 | Dean et al. |
| 2002/0133481 | A1 | 9/2002 | Smith et al. |
| 2002/0138479 | A1 | 9/2002 | Bates et al. |
| 2003/0018707 | A1 | 1/2003 | Flocken |
| 2003/0037074 | A1 | 2/2003 | Dwork et al. |
| 2003/0115023 | A1 | 6/2003 | Nickerson et al. |
| 2003/0120654 | A1 | 6/2003 | Edlund et al. |
| 2003/0167252 | A1 | 9/2003 | Odom et al. |
| 2003/0229640 | A1 | 12/2003 | Carlson et al. |
| 2004/0059708 | A1 | 3/2004 | Dean et al. |
| 2004/0119740 | A1 | 6/2004 | Chang et al. |
| 2004/0122811 | A1 | 6/2004 | Page |
| 2004/0153472 | A1 | 8/2004 | Rieffanaugh, Jr. |
| 2004/0188828 | A1 | 9/2004 | Nagatomo et al. |
| 2004/0215607 | A1 | 10/2004 | Travia, Jr. |
| 2005/0027691 | A1 | 2/2005 | Brin et al. |
| 2005/0033803 | A1 | 2/2005 | Vleet et al. |
| 2005/0050014 | A1 | 3/2005 | Gosse et al. |
| 2005/0060311 | A1 | 3/2005 | Tong et al. |

OTHER PUBLICATIONS

Brin, S. and L. Page, 'The Anatomy of a Large-Scale Hypertextual Web Search Engine', Computer Science Department, 1998.

Australian Government, examiners first report on patent application No. 2004275275, mailed Aug. 13, 2009, 2 pages.

International Preliminary Report on Patentability for PCT/US2004/029618, dated Mar. 13, 2006.

U.S. Appl. No. 10/726,345, filed Dec. 3, 2003, Pearson et al.

Boyan et al.; A Machine Learning Architecture for Optimizing Web Search Engines; Aug. 1996; Internet-based information systems-Workshop Technical Report-American Association for Artificial Intelligence, p. 1-8.

Joachims T. Evaluating retrieval performance using clickthrough data. Proceedings of the SIGIR Workshop on Mathematical/Formal Methods in Information Retrieval; Aug. 12-15, 2002; Tampere, Finland; 2002.

Joachims; *Optimizing search engines using clickthrough data*; 2002; Proceedings of the ACM SIGKDD International Conference on Knowledge Discovery and Data Mining, pp. 133-142.

Kelly, et al.; *Implicit Feedback for Inferring User Preference: A Bibliography*; SIGIR Forum, vol. 37, No. 2 (2003), pp. 18-28.

Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.

Burke, Robin, Integrating Knowledge'based and Collaborative-filtering Recommender Systems, AAAI Technical Report WS-99-01. Compilation copyright © 1999, AAAI (www.aaai.org), pp. 69-72.

Grčar, Miha, *User Profiling: Collaborative Filtering*, SIKDD 2004, Oct. 12-15, 2004, Ljubljana, Slovenia, 4 pages.

Hofmann, Thomas, *Latent Semantic Models for Collaborative Filtering*, ACM Transactions on Information Systems, vol. 22, No. 1, Jan. 2004, pp. 89-115.

Schwab, et al., *Adaptivity through Unobstrusive Learning*, 2002, 16(3), pp. 5-9.

W3C, URIs, URLs and URNs: Classification and Recommendations 1.0, Report from the joint W3C/IETF URI Planning Interest Group, Sep. 21, 2001, 8 pages.

Xiao, et al., *Measuring Similarity of Interests for Clustering Web-Users*, ADC, 2001, p. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

Pazzani, M., "A Framework for Collaborative, Content-Based and Demographic Filtering", 1999, 16 pages.

Zhang, X., "Collaborative Relevance Judgment: a Group Consensus Method for Evaluating User Search Performance" Journal of the American Society for Information Science and Technology, 53(3):220-231, 2002, 12 pp.

Chidlovskii, B. et al., "Collaborative Re-Ranking of Search Results", Proc. AAAI-2000 Workshop on AI for Web Search, Jul. 30, 2000, 5 pages.

Australian Opposition of Australian Patent Application No. 2004275275, dated Feb. 7, 2011, 12 pages.

Japanese Patent Office, Office Action for Japanese Application No. 2006-526320, dated Feb. 2, 2011, 2 pages.

* cited by examiner

METHODS AND SYSTEMS FOR IMPROVING A SEARCH RANKING USING POPULATION INFORMATION

CROSS-REFERENCE TO RELATED APPLICATIONS

This application is a continuation (and claims the benefit of priority under 35 USC 120) of U.S. application Ser. No. 10/661,741, filed Sep. 12, 2003 now U.S. Pat. No. 7,454,417. The disclosure of the prior application is considered part of, and is incorporated by reference in the disclosure of this application.

FIELD OF THE INVENTION

The invention generally relates to search engines. More particularly, the invention relates to methods and systems for improving a search ranking using population information.

BACKGROUND OF THE INVENTION

Conventional search engines operating in a networked computer environment such as the World Wide Web or in an individual computer can provide search results in response to entry of a user's search query. In many instances, the search results are ranked in accordance with the search engine's scoring or ranking system or method. For example, conventional search engines score or rank documents of a search result for a particular query by the number of times a keyword or particular word or phrase appears in each document in the search results. Documents include, for example, web pages of various formats, such as HTML, XML, XHTML; Portable Document Format (PDF) files; and word processor and application program document files. Other search engines base scoring or ranking results on more than the content of the document. For example, one known method, described in an article entitled "The Anatomy of a Large-Scale Hypertextual Search Engine," by Sergey Brin and Lawrence Page, assigns a degree of importance to a document, such as a web page, based on the link structure of the web page. Other conventional methods involve selling a higher score or rank in search results for a particular query to third parties that want to attract users or customers to their websites.

In some instances, a user in a particular location may enter a search query in a search engine to obtain search results relevant to the user. For example, a user in Japan may enter a search query to obtain search results that include Japanese language websites. In response to such queries, conventional search engines can return unreliable search results since there is relatively little data to rank or score search results according to the user's location that are relevant or useful to the user for the search query.

Conventional search engines can determine location information associated with a user from the type of web browser application used to access the search engine. For example, when a user downloads a web browser application from the Internet, the user may have the option to download a particular version of the application depending upon the user's preferred language, e.g. Japanese or French versions. When a user uses the French version of a web browser application to access a search engine via the Internet, the search engine can often determine that the user is likely located in France merely by detecting use of the French version of the web browser application.

Other conventional search engines obtain location information by the country domain suffix a particular user used in a search query. For example, a Japanese user requesting the Japanese version of a search engine may input the web address for the search engine with the country domain suffix of "co.jp" instead of the domain name suffix ".com." Based on such input, a search engine could determine that the user is likely located in Japan.

If a search engine returns more than one search result in response to a search query, the search results may be displayed as a list of links to the documents associated with the search results. A user may browse and visit a website associated with one or more of the search results to evaluate whether the website is relevant to the user's search query. For example, a user may manipulate a mouse or another input device and "click" on a link to a particular search result to view a website associated with the search result. In many instances, the user will browse and visit several websites provided in the search result, clicking on links associated with each of the several websites to access various websites associated with the search results before locating useful or relevant information to address the user's search query.

Clicking on multiple links to multiple websites associated with a single set of search results can be time consuming. It is desirable to improve the ranking algorithm used by search engines and to therefore provide users with better search results.

SUMMARY

Embodiments of the present invention comprise systems and methods that improve search rankings for a search query by using population information associated with the search query are described. One aspect of the present invention comprises receiving a search query, and determining a population associated with the search query. Such populations may be defined and determined in a variety of ways. Another aspect of an embodiment of the present invention comprises determining an article (such as a webpage) associated with the search query, and determining a ranking score for the article based at least in part on data associated with the population. A variety of algorithms using population information may be applied in such systems and methods.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

The present invention comprises methods and systems for improving a search ranking by using population information. Reference will now be made in detail to exemplary embodiments of the invention as illustrated in the text and accompanying drawings. The same reference numbers are used throughout the drawings and the following description to refer to the same or like parts.

Figure 1:
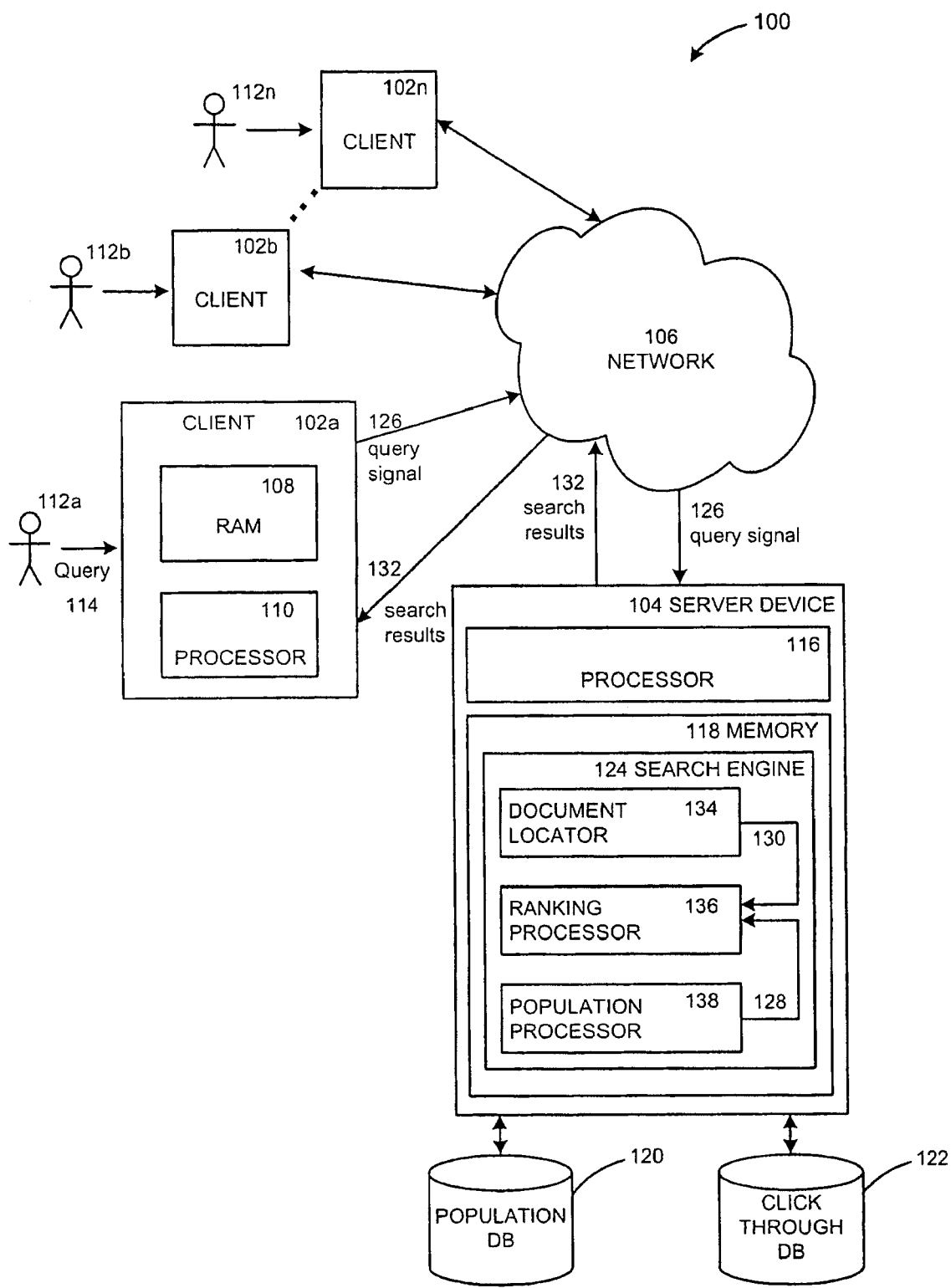
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate in, and be embodied in, other systems as well.

The system 100 shown in FIG. 1 includes multiple client devices 102a-n, a server device 104, and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example, computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a browser application program such as Internet Explorer™, version 6.0 from Microsoft Corporation; Netscape Navigator™, version 7.1 from Netscape Communications Corporation; and Safari™, version 1.0 from Apple Computer.

Through the client devices 102a-n, users 112a-n can communicate over the network 106 with each other and with other systems and devices coupled to the network 106. Users 112a-n can be located in different locations, countries, or regions. As shown in FIG. 1, a server device 104 is also coupled to the network 106. In the embodiment shown, a user 112a-n can generate a search query 114 at a client device 102a-n to transmit to the server device 104 via the network 106. For example, a user 112a in one country types a textual search query 114 into a query field of a web page displayed on the client device 102a. The client device 102a then transmits an associated search query signal 126 reflecting the search query 114 via the network 106 to the server device 104.

The server device 104 shown includes a server executing a search engine application program such as the Google™ search engine. Similar to the client devices 102a-n, the server device 104 shown includes a processor 116 coupled to a computer readable memory 118. Server device 104, depicted as a single computer system, may be implemented as a network of computer processors. Examples of a server device 104 are servers, mainframe computers, networked computers, a processor-based device and similar types of systems and devices. Client processors 110 and the server processor 116 can be any of a number of well-known computer processors, such as processors from Intel Corporation of Santa Clara, Calif.; and Motorola Corporation of Schaumburg, Ill.

Memory 118 contains the search engine application program, also known as a search engine 124. The search engine 124 locates relevant information in response to a search query 114 from a user 112a-n.

The server device 104, or related device, has previously performed a search of the network 106 to locate articles, such as web pages, stored at other devices or systems connected to the network 106, and indexed the articles in memory 118 or another data storage device. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet), a personal computer, or other computing or storage means. The embodiments described herein are described generally in relation to documents, but embodiments may operate on any type of article.

The search engine 124 responds to the associated search query signal 126 reflecting the search query 114 by returning a set of relevant information or search results 132 to client device 102a-n from which the search query 114 originated.

The search engine 124 shown includes a document locator 134, a ranking processor 136, and a population processor 138. In the embodiment shown, each comprises computer code residing in the memory 118. The document locator 134 identifies a set of documents that are responsive to the search query 114 from a user 112a. In the embodiment shown, this is accomplished by accessing an index of documents, indexed in accordance with potential search queries or search terms. The ranking processor 136 ranks or scores the search result 132 including the located set of web pages or documents based upon relevance to a search query 114 and/or any another criteria. The population processor 138 determines or otherwise measures a population signal such as a population signal 128 that reflects or otherwise corresponds to a population associated with a user 112a-n. Note that other functions and characteristics of the document locator 134, ranking processor 136, and population processor 138 are further described below.

Server device 104 also provides access to other storage elements, such as a population data storage element, in the example shown a population database 120, and a selection data storage element, in the example shown, a selection data database 122. The specific selection database shown is a clickthrough database, but any selection data storage element may be used. Data storage elements may include any one or combination of methods for storing data, including without limitation, arrays, hashtables, lists, and pairs. Other similar types of data storage devices can be accessed by the server device 104. The population database 120 stores population information associated with users 112a-n inputting search queries. Examples of population information associated with users 112a-n includes information about the locations of users 112a-n, information about the populations with which users 112a-n are associated, and information about groups with which users 112a-n are associated.

Examples of locations of users can include, but are not limited to, a continent, a region, a country, a state, a county, or a city. By way of example, locations of users can be identified by country, such as France, Germany, Japan, and the United States.

Examples of populations with which users are associated can include, but are not limited to, a gender, a demographic, an ethnicity, a continent, a region, a country, a state, a county, or a city. By way of example, populations with which users are associated with can be identified by age ranges of the user, such as "under 18 years old," "18-24 years old," "25-34 years old," "35-49 years old," "50-62 years old," and "over 62 years old."

Examples of groups with which users are associated, can include, but are not limited to, a gender, a demographic group, an ethnic group, persons with a shared characteristic, persons with a shared interest, and persons grouped by a predetermined selection. By way of example, groups with which users can be associated with can be identified as "all persons interested in collecting ancient shark teeth," and "all persons not interested in collecting ancient shark teeth."

Population information can also include self identification-type data or automatic identification-type data. Self identification-type data includes, but is not limited to, user registration data, user preference data, and other user selected data. By way of example, self-identification data is a language preference selection that a user inputs into a browser application program. Automatic identification-type data includes, but is not limited to, the Internet protocol address of a user's location, default data obtained from a user's browser application program, cookies, and other data collected from a user's application program when the user's application program interacts with a search engine. By way of example, automatic-identification data may comprise the domain of a user's network address on the Internet, or may be information stored in a "cookie" obtained by or accessed by a user's browser application program.

The search engine 124 determines population information or otherwise executes a set of instructions to determine population information associated with users 112a-n, and stores population-type information in the population database 120. Alternatively, the population processor 138 determines population information or otherwise executes a set of instructions to determine population information associated with users 112a-n, and stores population-type information in the population database 120.

It should be noted that the present invention may comprise systems having different architecture than that which is shown in FIG. 1. For example, in some systems according to the present invention, the population database 120 and processor 138 may not be part of the search engine 124, and may carry out modification of population data or other operations offline. Also, in other embodiments, the population processor 138 may affect the output of the document locator 134 or other system. The system 100 shown in FIG. 1 is merely exemplary, and is used to explain the exemplary methods shown in FIGS. 2-3.

Figure 2:
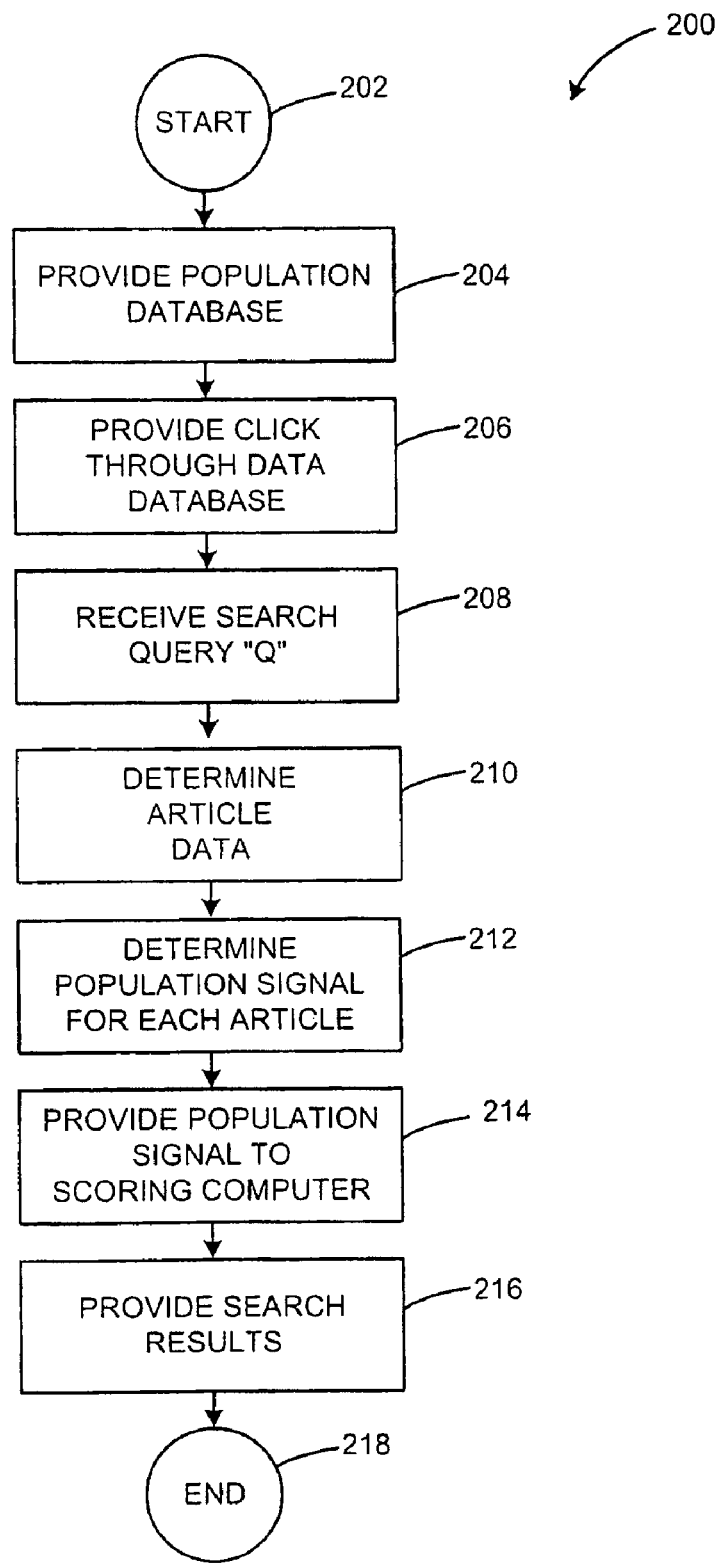
FIG. 2 illustrates a flow diagram of a method in accordance with one embodiment of the present invention.
Figure 3:
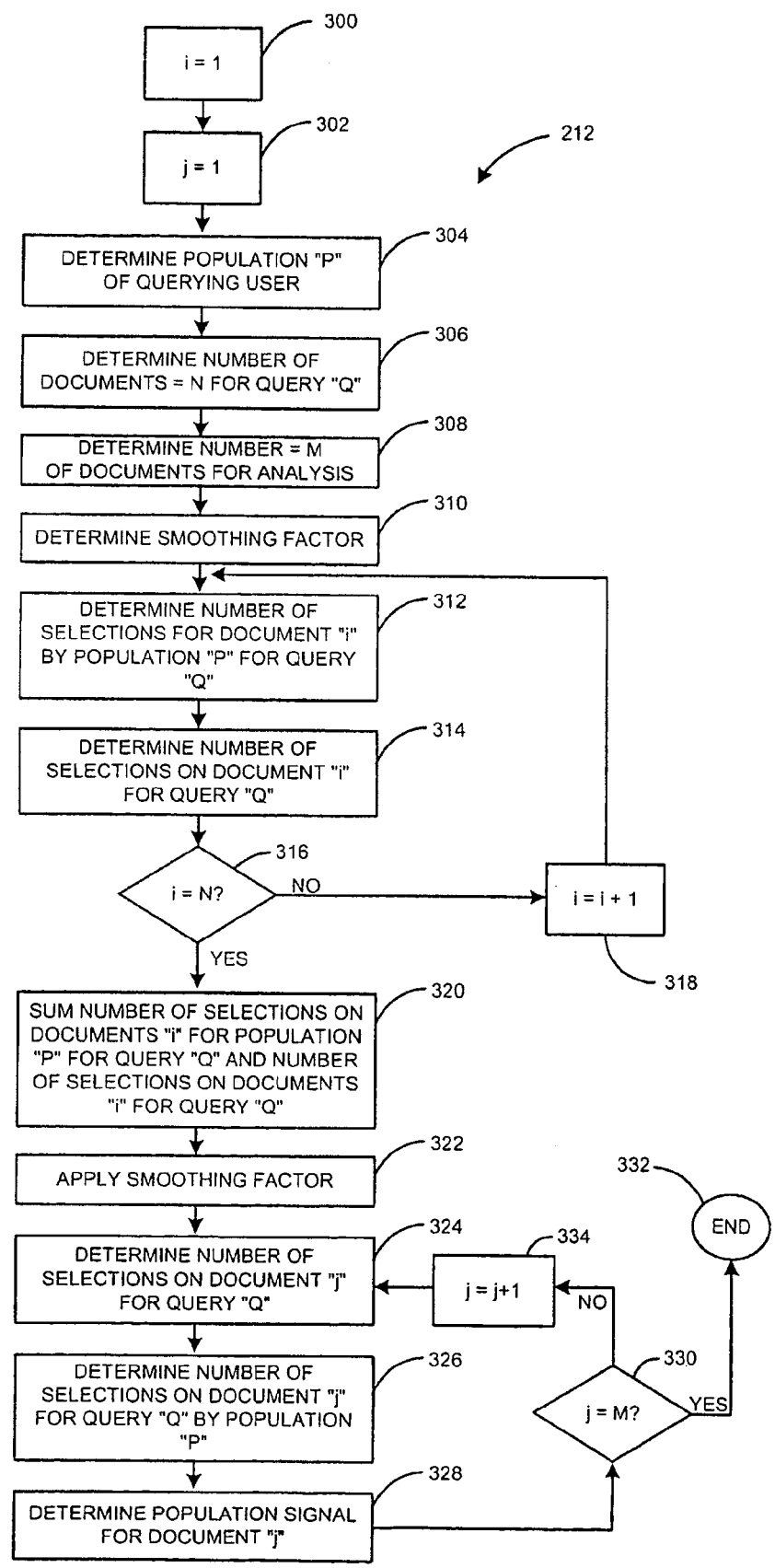
FIG. 3 illustrates a flow diagram of a subroutine of the method shown in FIG. 2.

In the embodiment shown, the population database 120 contains data gathered and stored prior to carrying out the example method of the present invention as shown in FIGS. 2-3. Still referring to FIG. 1, the population processor 138 shown records population information associated with users 112a-n by obtaining and analyzing the location of a user inputting a search query and selecting search results for the search query. For example, when a user 112a in Japan types in a first search query such as "boating," the population processor 138 determines that the user 112a is transmitting the search query from an Internet protocol address located in Japan, and is also using Japanese language preferences for the browser application program. Furthermore, when the user 112a selects particular search results returned by the search engine in response to the search query, the population processor 138 determines that the user 112a selects particular documents in the Japanese language. Thus, when a user 112a in Japan inputs the query "boating," search results relevant to the user 112a in Japan may be returned such as "boating-.co.jp." Other types of population information can be determined by the invention and stored by the population database 120.

By way of another example, the population database 120 can store information that a user is associated with sub-populations of a population. For example, the population processor 138 determines that a user 112a in Europe, a region in the world, is from Luxembourg, a country in Europe. The population database 120 can also store information that another user in Europe is from France, another country in Europe. Thus, while each user is associated with the population of "Europe," each user is associated with a respective sub-population, "Luxembourg" and "France." Populations and sub-populations can include, but are not limited to, continents, regions, countries, states, counties, cities, genders, demographic groups, ethnic groups, languages spoken, universal resource locators, internet protocol addresses, domain names, internet service providers, groups, persons with shared characteristics, persons with shared interests, and persons grouped by a predetermined selection. Various levels of sub-populations can exist for a population. For example, "Parisians" are a sub-population to "France" which is a sub-population to "Europe" which is a sub-population to the "World." Subpopulation information can be useful if there is an insufficient number of user clicks from users from a particular location or population such as France. However, since France is a sub-population of "Europe," click information corresponding to users in "Europe" could be used to augment the click information for a query from the user in France. Generally, if click information for a sub-population is sparse or does not exist, information from a higher population level can be used to augment the click information.

In determining population and sub-population information, the population processor 138 can also determine a weight for each type of information. For example, the population processor 138 can determine to weight that a user is from a particular region less than the weight for information that a user is from a particular country so that improved search results for subsequent search queries can be obtained from region and country information. Thus, information that a user is from a particular region (Europe) can be weighted less than information that a user is from a particular country (France). Other types of weighting or similar, population-type data can be defined by the invention and stored by the stored by a population database 120.

The population database 120 shown includes a list of user locations for a particular query. For example, for the search query "boating," population information such as the determined location of users who input the query "boating" are stored and associated with the search query "boating." The user's locations can be "France," "Japan," and the "United States." These locations are used for example purposes. In other embodiments, the number of locations can be greater or fewer, or other countries, locations, populations, or sub-populations can be used.

An example of information stored in a population database implemented by various embodiments of the invention is as follows:

| Query | Locations |
|-------|-----------|
| Q1 | Japan, France, United States |
| Q2 | Europe, Asia, North America |

In the table shown above, the first column lists unique queries and the second column lists corresponding locations of users. Each query represents a search query input by a user. The corresponding locations of users represents the determined location of users who input the respective query. Thus, in for query "Q1" shown above, determined locations of users who previously input the query "Q1" includes "Japan," "France," and the "United States." When the table is implemented by the invention, the search engine 124 can call upon the determined locations of users in the "Location" column for a particular query such as "Q1." When a new query is input by a user, the new query is inserted into the "Query" column. Likewise, when a location of a user is determined for the new query, the new location is inserted into the second column titled "Location."

The clickthrough database 122 shown stores data associated with users' selection of a search result 132 from a search engine 124, such as from a list of documents located in response to a search query 114. For example, a user 112a enters an input at a client device 102a-n, such as manipulating a mouse or another input device to click on one or more URLs associated with web pages or documents of a search result 132. A user "click" is generated by the user's selection of a document located in the search result 132. This "click" on a document is stored in the clickthrough database 122 as a selection associated with the document's presence in a search result returned for a particular search query. Many other such selection-type data, associated with users' selections of documents in search results, are stored there as well.

User clicks are referred to as "clickthrough" data. In the embodiment shown, the search engine 124 measures and stores the clickthrough data as well as other data related to each of the documents located in the search result 132.

Clickthrough data is generally an indicator of quality in a search result. Quality signals or clickthrough data can include, but is not limited to, whether a particular URL or document is clicked by a particular user; how often a URL, document, or web page is clicked by one or more users; and how often a particular user clicks on specific documents or web pages. Other types of quality signals similar to clickthrough data, such as user inputs or observational type data, can be stored by a clickthrough database 122 or similar data storage devices.

Other data related to documents located in a search result 132 that can be stored in a clickthrough database 122 or other data storage device can include, but is not limited to, how often a particular URL, document, or web page is shown in response to a search query 114; how many times a particular search query 114 is asked by users 112a-n from a particular location; how many times a particular search query 114 is asked by users 112a-n from a particular population; how many times a particular document is selected by users 112a-n from a particular location, how many times a particular document is selected by users 112a-n from a particular population; how many times a particular document is by selected by users 112a-n for a particular search query 114; the age or time a particular document has been posted on a network 106, and identity of a source of a particular document on a network 106.

Population information from the population database 120 and selection data from the selection database (shown as a clickthrough database 122) can be processed by the population processor 138 and stored for subsequent use. For example, the population processor 138 retrieves clickthrough data for a particular search query. The clickthrough data for the particular search query is apportioned based on users' locations. The search engine 124 calls to the population database 120 for location information for all users entering a particular search query and selecting documents for the search result for the query. If the population processor 138 determines that users from three locations, Japan, France, and the United States, submitted selection data for a particular query 114, a respective designation for each set of users from each location can be defined by the population processor 138. Thus, users from Japan can be designated as "J," users from France can be designated as "F," and users from the United States can be designated as "US." The population processor 138 then apportions the number of clicks collected by the clickthrough database 122 for the particular set of documents to each respective designation based on user location.

One example of information stored in a population database implemented by an embodiment of the invention is as follows:

| Query | Document | Total Number of All Clicks | Japan | France | United States |
|-------|----------|---------------------------|-------|--------|---------------|
| Q | $D_1$ | 101 | 1 | 20 | 80 |
| Q | $D_2$ | 207 | 2 | 5 | 200 |
| ... | ... | ... | ... | ... | ... |
| Q | $D_i$ | $\#(Q, D_i, A)$ | $\#(Q, D_i, J)$ | $\#(Q, D_i, F)$ | $\#(Q, D_i, U)$ |
| ... | ... | ... | ... | ... | ... |
| Q | $D_N$ | $\#(Q, D_N, A)$ | $\#(Q, D_N, J)$ | $\#(Q, D_N, F)$ | $\#(Q, D_N, U)$ |
| Q | $D_{total}$ | 1500 | 100 | 300 | 1100 |

In the example provided above for the population database 120 shown, for the search query "Q," the total number of user clicks on document "$D_1$" was "101." The total number of user clicks on document "$D_1$" by users located in Japan was "1," the total number of user clicks on document "$D_1$" by users located in France was "20," and the total number of user clicks on document "$D_1$" by users located in the United States was "80."

In the embodiment shown in FIG. 1, the server 104 is in communication with the population database 120 and the clickthrough database 122. The server 104 carries out a process by which the data in the two databases 120, 122 are used to improve the search results provided in response to a search query 114 from a user 112a.

Various methods in accordance with the present invention may be carried out. One exemplary method according to the present invention comprises receiving a search query, determining a population associated with the search query, determining an article (such as a web page) associated with the search query, and determining a ranking score for the article based at least in part on data associated with the population. This population information is thus used to impact the ranking score for the article. Preferably, this population information indicates behavior of the population determined (e.g., a group or sub-group) relative to the search query and/or the article. For example, this information may indicate the preferred articles selected by others in the same, similar, or related population in relation to the same, similar, or related query.

A ranking score for a second article, a third article, a fourth article, etc., associated with the search query may also be determined based at least in part on information associated with the population. These articles may then be ranked against each other based on the ranking score and presented in a ranked order to the person submitting the search query. Preferably, this results in a ranking that provides the most relevant articles to the user first.

The population associated with the query can be one or more of a variety of populations. Examples include, but are not limited to demographic data such as age, age range, sex, race, primary language, secondary language, location, income, income range, a continent, a region, a country, a state, a county, a city, a gender, an ethnic group, a group, persons with a shared characteristic, persons with a shared interest, persons grouped by a predetermined selection, and interne service provider data (or the likely or possible data for any of these). In other words, the population may be any group determined by any characteristics selected.

The population associated with the search query may be determined in one or more of a variety of ways. For example, demographic data associated with a sender of the search query may be determined in order to determine the population of interest, and this data can be any one or more of the above-mentioned populations or others. For example, a likely geographic location for the sender of the search query may be determined by identifying the Internet Protocol address from which the search query was sent, an address input by the sender to access a search engine, or demographic data input by the sender. The population associated with the search query may also be determined in other ways, such as determining demographic data associated with the search query. This may be accomplished by, for example, determining the language of the search query or determining data associated with previous senders of the search query.

As can be seen, determining a population associated with the search query can comprise determining self-identification data, automatic-identification data, or other data or information associated with a user transmitting the search query, such as user registration data, user preference data, and user selected data. For example, in registering for membership or access to a web site, a user may input registration information. The user may express preferences during such a registration process (e.g., preferred language) or may express preferences in other ways (such as in selection of web pages or domain use). Automatic-identification data may comprise, for example, an IP address, a domain, default data obtained an application associated with the user, or other automatically-procured or automatically-provided information. There can be, of course, some overlap between self-identification data and automatic-identification data.

Data associated with the population determined may itself by determined in one or more of a variety of ways. For example, a selection score for the article in a context of the population may be determined. As an illustration, it may be determined that a certain number of members of the population associated with the search query at hand had previously clicked on the article at issue. This selection score may indicate the relative interest of members of the population in the article at issue.

Again, there are a wide variety of data that can comprise the population information. Other examples include a number of members of the population, a number of members of the population that selected a result returned for the search query previously, a number of members of the population that input the search query, a number of members of the population to which search results for the search query were shown, a total selection score, and a total number of members of the population that selected the article. There are many other examples.

In some instances, more than one populations associated with the search query may be determined and used in order to provide improved search results. In one embodiment, for example, a second population associated with the search query is determined, determining the ranking score for the article is further based at least in part on data associated with the second population.

These and other aspects of embodiments of the present invention are described further herein. These exemplary aspects of embodiments of the present invention may be repeated or iterated to improve search results. Moreover, these and other steps taken in methods according to the present invention may be stored in the form of program code in a computer-readable medium, such as memory associated with a processor, a disk, or other computer-readable medium.

FIGS. 2-3 illustrate an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIGS. 2-3. The method 200 shown provides an improvement of a search ranking using population information.

Each block shown in FIGS. 2-3 represents one or more steps carried out in the exemplary method 200. Referring to FIG. 2, in block 202, the example method 200 begins. Block 202 is followed by block 204, in which a population database 120 is provided. This may be accomplished by, for example, constructing such a database or establishing communication with such a database. As described with reference to FIG. 1, the population database 120 stores population-type information for documents selected in a search result for a search query 114 and other search queries.

Block 204 is followed by block 206, in which a selection database, in this case a clickthrough database 122, is provided. This may be accomplished by, for example, constructing such a database or establishing communication with such a database. As described with reference to FIG. 1, the clickthrough database 122 stores data associated with users' clicks or inputs to a search result 132 provided by the search engine 124, such as a list of documents, such as web pages, provided in response to a search query 114 from a user 112a.

Block 206 is followed by block 208, in which a search query, in the form of a search query signal is received by the server. In the embodiment shown, a user 112a generates a search query 114 at a client device 102a. The client device 102a transmits an associated search query signal 126 reflecting the search query 114 to the server device 104 via a network 106. The search engine 124 receives the search query signal 126 and processes the search query 114. For example, if the user 112a types a search query "boating" into the search or query field of a search page on a browser application program, the client 102a transmits a search query signal 126 that includes the text "boating" or some other representation or indication of "boating." The search engine 124 receives the signal 126 and determines that "boating" is the desired search query 114.

Block 208 is followed by block 210, in which article data, in the case shown, document data, is determined and received. In this block 210 in the embodiment shown, the search engine 124 conducts a search for relevant documents in a search database (not shown) or memory 118 that have previously been indexed from the network 106. The search engine 124 receives document data from the search database or memory 118 in response to the search query signal 126 reflecting the search query 114 from the user 112a. The document data is also referred to as the initial search result for the search query 114. Document data can include, but is not limited to, a universal resource locator (URL) that provides a link to a document, web page, or to a location from which a document or web page can be retrieved or otherwise accessed by the user 112a via the network 106. Note that document data is sometimes referred to as a "document" throughout the text of the specification. Alternatively, the document locator 134 obtains or otherwise receives document data in response to a search query signal 126 reflecting a search query 114.

For example, in block 210 shown, the search engine 124 shown would determine a list of documents responsive to the search query "boating." This list of documents would comprise the determined document data. An initial search result list for "boating" could comprise a list of 15 documents. In the embodiment shown, this initial determination of document data may be by means of a conventional search engine query and results return.

Block 210 is followed by block 212, in which a population signal is determined for each article of interest. In the embodiment shown, the search engine 124 generates a population signal 128 for each document of the initial search result list determined in block 210 using a population function. For example, a population signal may be determined for each of the 15 documents identified in the initial search result determined in block 210.

The population signal indicates a rating or score for the article of interest, and this rating or score reflects the relative interest of those in the same population group as the searching user. For example, articles previously selected by users in the same population group as the querying user 112a when carrying out the same query "Q" as input by the user 112a may receive a higher score for a population signal than articles previously selected only by users in population groups of which the user is not a member. This is but one example, however, and many variables and permutations may be used. This rating or score reflected in the population signal may be used alone or in combination with other scoring or rating signals to score or rank the document, and to rank and compare groups of documents to, for example, provide a search result for the query sent by the user.

In the embodiment shown, the population signal is determined by a population signal function. The population signal function may comprise an algorithm for calculating the population signal based on one or more variables. The population signal function in the embodiment shown comprises a set of instructions processed by the population processor 138. The algorithm is stored in memory 118.

Any one or more of a variety of population signal functions may be implemented by various embodiments of the invention. Examples of variables that may be included in a population signal function include, without limitation, one or more of the following:

a total selection score for an article "d" for query "q," (e.g., the total number of clicks by all users on document "d" returned in search results in the context of query "q", or the total number of members of a population that selected a document "d");
  a selected or calculated weight of relationship between the selection score for article "d" for a query "q" (e.g., the total number of clicks by all users in population "pop" on the document "d" returned in search results in the context of search query "q.");
  a selection score for document "d" for query "q" in the context of members of a population "pop" (e.g., a number of clicks for a document by members of the population when the document is returned for a search for query "q");
  a smoothing factor that reflects how much data is needed to trust a click signal (e.g., a factor that reflects reliability or trust in the number of clicks by all users on document "d" returned in search results for query "q");
  a selection score for document "d" (e.g. number of clicks on document "d") for query "q" in the context of all users regardless of a population;
  a total selection score for a set of documents (e.g., the number of clicks on all documents returned for query "q") by all users regardless of population;
  a selection score for a set of documents (e.g., the number of clicks on all documents returned for query "q") by all users in a population "pop";
  a total selection score for document "d" (e.g. number of clicks on document "d") by all users in a population "pop" for any query "$q_i$";
  a selection score for document "d" (e.g. number of clicks on document d") by all users regardless of population for any query "$q_i$;";
  a number of times a query "q" was input by users in a population "pop";
  a number of times a query "q" was input by all users regardless of population;
  a number of members of a population (e.g., a number of members of a population that input a particular search query, selected a result returned for a particular search query, or were shown search results for a particular search query);
  one or more other ranking factors or scores, based on population, the article under consideration, and/or other factors.

There are a variety of other variables that may be included, and these are only examples. Moreover, these and other variables may be limited or defined by designated time period, a designated number of users, the number of users who are self-identified or automatically identified in a population, by those who input a query "Q," or by other limitations or refinements. Variables, limitations, definitions, or other data associated with population data are generally referred to as population information or population data.

An example of a population signal function is as follows:

$$S(q, d_j) = \frac{\#(q, d_j, P) + \mu \left[ \frac{\#(q, d_j)}{\sum_{i=1}^{N} \#(q, d_i) + \mu} \right]}{\sum_{i=1}^{N} \#(q, d_i P) + \mu} \quad (1)$$

wherein "$S(q, d_j)$" is a score calculated for document "j" for a search query "q," based upon the population information and clickthrough data for users of a particular population "P;"

"$\#(q, d_j, P)$" is the number of times document "d" was clicked by users in population "pop" for search query "q;"

"$\mu$" is a smoothing factor that reflects how much data is needed to trust a click signal such as the number of clicks by users of population "P" for a query "q;"

"#(q, d$_j$)" is the number of times document "d" was clicked by all users regardless of population for query "q;"

"#(q, d$_i$)" is the total number of user clicks on document "i" for query "q;" and "# (q, d$_i$, P)" is the total number of user clicks for all users of population "P" for document "i" for query "q."

Another example of a population signal is as follows:

$$S(q, d_j) = \frac{\#(q, d_j, P) + \mu \left[ \frac{\#(q, d_j)}{\sum_{i=1}^{N} SH(q, d_i) + \mu} \right]}{\sum_{i=1}^{N} SH(q, d_i P) + \mu} \quad (2)$$

wherein "SH(q,di)" is the number of times document "i" was shown for query "q;"

"SH(q,di,P)" is the number of times document "i" was shown for query "q" for population "P;" and the other variables are described with respect to example (1).

Another example of a population signal is as follows:

$$S(q, d_j) = \frac{\#(q, d_j, P) + \mu_1 \left[ \frac{\#(q, d_j)}{\sum_{i=1}^{N} \#(q, d_i) + \mu_2} \right]}{\sum_{i=1}^{N} \#(q, d_i P) + \mu_1} \quad (3)$$

wherein "$\mu_1$" is a smoothing factor that reflects how much data is needed to trust a click signal such as the number of clicks by users of population "P" for a query "q;"

"$\mu_2$" is a smoothing factor that reflects the how much data is needed to trust a click signal such as in the number of clicks by all users for a query "q;" and the other variables are described with respect to examples (1) and/or (2).

For purposes of illustration, the algorithm from example (1) is embodied in the example method according to the present invention shown in FIGS. 2-3. Other algorithms besides the examples shown in (1), (2), and (3) may be used in accordance with the present invention, and algorithm (1) is provided to illustrate examples. Such other algorithms may contain some, all, or none of the variables shown in examples (1), (2), and (3).

FIG. 3 illustrates an example of a subroutine 212 for carrying out the method 200 shown in FIG. 2 in accordance with example (1). The subroutine 212 shown provides a population signal 128 for each document received in an initial search result 132. In other embodiments, the number of documents so analyzed may be limited to less than all documents received. An example of subroutine 212 is as follows.

Referring to FIG. 3, the example subroutine 212 begins at block 300. At block 300, a counter associated with the search engine 124 is set to a value such as "1." For example, the population processor 138 can set a variable "i" in an associated memory 118 to an initial value of "1." The counter or variable "i" counts the number of documents that are processed by the subroutine 212, and the current value of "i" reflects which document in the list of documents in the document data is under operation.

Block 300 is followed by block 302, in which another counter associated with the search engine 124 is set to a value such as "1." For example, the population processor 138 can set a variable "j" in an associated memory 118 to an initial value of "1." The counter or variable "j" counts the number of documents that are processed by the subroutine 212, and the current value of "j" reflects which document in the list of documents in the document data is under operation.

Block 302 is followed by block 304, in which a population is determined for querying user 112a. The search engine 124 determines a population, in this case "P." For example, the search engine 124 determines a population associated with the user inputting the search query "Q." As previously described, self-identification data or automatic-identification data, or a combination of both, can be utilized by the search engine 124 to determine a population associated with the user. In this embodiment, the search engine 124 determines from a user's Internet Protocol address that the user is likely from France, designated as population "F," therefore the search engine 124 cross-references population information of users from France that have previously selected document "D$_1$" for the query "Q." Upon determining a population "P" for the querying user, the search engine 124 can call to the population database 120 to obtain any corresponding population information as needed. For example, the search engine 124 can retrieve data from the population database 120 and determine that a total of "20" users in France, population "F," have previously selected a particular document "D$_1$" for the search query "Q." Therefore, population information for a particular population "P" can be applied by the search engine 124 to calculate a population signal for document "D$_1$" in accordance with the present invention.

Block 304 is followed by block 306, in which a number of documents for analysis is determined. In block 210, the server 104 received document data associated with the search query 114. Among the data determined was the total number of documents in the list of documents responsive to the search query 114.

This number of documents is characterized by (and is set as) the variable "N." For example, as mentioned earlier, a search result for the search query "boating" could have 15 documents, and the server 104 would set "N" to a value of "15."

Note that in alternative embodiments, any total number of documents for a search query that has been defined or otherwise stored by the population database 120 or another data storage device for a particular query can be transmitted to, or otherwise determined by the search engine 124 or population processor 138. Further note that the number of documents for each search result for a particular search query can depend upon the population-type information previously stored in the population database 120 as well as clickthrough data stored in the clickthrough database 122, or on other similar types of data stored in other data storage devices.

Block 306 is followed by block 308, in which a variable "M" is determined. The variable "M" reflects the number of documents for which a population signal is determined. In most instances, "M" will have the same value as the variable "N," or the number of documents determined in block 306 but it may be different. For example, as mentioned earlier, a search result for the search query "boating" could have 15 documents, wherein the server set the variable N=15, and the server 104 would also set "M" to a value of "15."

Block 308 is followed by block 310, in which a smoothing factor is determined. The search engine 124 determines a smoothing factor that reflects how much data is needed to trust a click signal such as user clicks from users from a particular population for a particular query. For example, the population processor 138 utilizes a predetermined equation or set of computer-executable instructions to determine the smoothing factor that accounts for how much data is needed to trust a click signal or the quality of the user clicks from all users and from users from a particular population for a particular query. The smoothing factor can be particularly useful if there are very few user clicks from users of a particular population or if user clicks from a particular source is known or otherwise perceived not to be reliable or otherwise trustworthy. In that case, the smoothing factor can be set to a constant value or a value that can otherwise influence the weight or value of the data associated with a particular population. In most instances, the smoothing factor is applied to a population signal function or to a set of computer-executable instructions processed by the population processor 138.

As applied to an example, for the query "boating," the population processor 138 determines a smoothing factor if there is an insufficient number of user clicks from users in France. Thus for the example in the table above, if query "Q" is "boating" and 20 user clicks from users in France is not a sufficient number of clicks to rely upon, then a smoothing factor is determined. The smoothing factor is represented by "$\mu$" in the population signal function above in subroutine 212. This factor indicates the reliability or perceived trust in the number of clicks by users in France to the search query "boating."

As applied to another example, for the query "cricket" by a user in France, the population processor 138 determines a smoothing factor if there is an insufficient number of user clicks from users in France. However, since France is a sub-population of "Europe," the population processor 138 can use click information corresponding to users in "Europe" to augment the click information for the query "cricket" from the user in France. Generally, if click information for a sub-population is sparse or does not exist, information from a higher population level can be used to augment the click information. In some instances, there may be additional levels of populations and sub-populations that could be used in this manner, i.e., "Parisians" are a sub-population to "France" which is a sub-population to "Europe" which is a sub-population to the "World."

Note that in some instances, a general smoothing factor can be determined. The search engine 124 determines a general smoothing factor that reflects the reliability or trust in user clicks by all users for a particular document for a particular query. In the example shown, an assumption is made that the reliability or trust in user clicks from the local population is the same as the reliability or trust of user clicks from the general population, and the smoothing factor as determined above can be used as the general smoothing factor.

By way of further example, a general smoothing factor can be determined as follows. The population processor 138 accesses the population database 120 or other data storage device to retrieve user click data. Using a predetermined equation or set of computer-executable instructions, the population processor 138 determines the number of user clicks by all users for all documents in a search result for a particular query. The general smoothing factor can then be set as the number of clicks or selections by all users for all documents in a search result for a particular query.

If smoothing factors, values, or scores for a particular document for a particular query have previously been stored in the population database 120, the population processor 138 retrieves the smoothing factors, values, or scores for a particular query. For example, the population database 120 may indicate that there is an insufficient number of clicks from all users for a document in a search result for the search query "boating," such as in the table above where only one user from Japan selected a document "$D_1$" for the query "Q." In this instance, the total number of clicks from all users for all documents in the search result for the search query "boating" should be used. A general population smoothing factor as determined above can then be used in an algorithm to gradually transition between the two results. A determination can be made whether to use the number of clicks from all users for a document in a search result for the search query "boating," or the total number of clicks from all users for all documents in the search result for the search query "boating" so that improved search results can be obtained from population information and selection data.

Block 310 is followed by block 312, in which a number of selections, in this case clicks, by a particular population "P" is determined for the current document of interest (document "i") for a particular query ("Q"). The search engine 124 determines the number of clicks for document "i" when document "i" is returned in search results for query "Q." For example, the population processor 138 accesses population information stored by the population database 120 or other data storage devices as well as clickthrough data stored by the clickthrough database 122 or previously shared with the population database 120. The population processor 138 applies a predetermined equation or set of computer-executable instructions to some or all of the population information and clickthrough data to determine the number of clicks by a population on a document for a search query, also referred to as "$\#(q,d_i,P)$." For example, if the query "Q" is "boating," then it can be determined that there were 20 total user clicks by users in the France on document "$D_1$" for query "Q."

Block 312 is followed by block 314, in which a number of selections, in this case clicks, by all users is determined for the current document of interest (document "i") for a particular query ("Q"). The search engine 124 determines the number of clicks by all users for document "i" when document "i" is returned in search results for query "Q." For example, the population processor 138 accesses population information stored by the population database 120 or other data storage devices as well as clickthrough data stored by the clickthrough database 122 or previously shared with the population database 120. The population processor 138 applies a predetermined equation or set of computer-executable instructions to some or all of the population information and clickthrough data to determine the number of clicks by all users regardless of population on a document for a search query, also referred to as "$\#(q,d_i)$." For example, if the query "Q" is "boating," then it can be determined that there were 101 total user clicks by all users regardless of population on document "$D_1$" for query "Q."

Block 314 is followed by decision block 316, in which a decision is made whether all documents for a search query have been processed. The search engine 124 compares the counter or variable "i" initially set at a value of "1" in block 300 to the variable "N," which has been set to a value in block 306 according to the number of documents to be processed for the search query "Q." If not all the documents have been processed, then the counter or variable "i" will not equal the variable "N" and the "NO" branch is followed to block 318. In alternative embodiments, a maximum number of documents for analysis may be set. For example, "N" may be set to a maximum number that is less than the number of documents determined in block 306.

In block 318, a counter is incremented to track the number of documents that have been processed. For example, the counter or variable "i" initially set at a value of "1" is incremented to a next value such as "2." The subroutine 212 then returns to block 312 to continue processing the next document. Subsequent documents are processed by blocks 312-314, and the counter or variable "i" at block 318 is subsequently incremented until all of the documents are processed, and the value of the counter or variable "i" equals "N." Thus, in the example provided previously for "boating," all 15 documents of the search result for the search query "boating" would be processed by blocks 312-314.

When all of the documents have been processed, the "YES" branch is followed from decision block 318, and the subroutine 212 continues at block 320.

At block 320, a sum of the number of selections, in this case clicks, by a particular population "P" for all documents (documents "i") for a particular query ("Q"), and a sum of the number of selections, in this case clicks, by all users for all documents (documents "i") for a particular query ("Q") are determined. In the embodiment shown, the search engine 124 determines a sum of the number of selections, in this case clicks, by a particular population "P" for all documents (documents "i") for a particular query ("Q") that describes the total number of clicks by the particular population "P" on documents associated with a search query "Q." For example, the population processor 138 determines a sum which reflects some or all user clicks from a particular population "F" on documents returned in response to a prior search for a search query "Q." The sum can then be applied by the search engine 124 or population processor 138 to a population signal function or to set of computer-executable instructions. Note that the number of selections determined in block 312 is summed by block 320 for all documents "i."

Furthermore, the search engine 124 determines a sum of the number of selections, in this case clicks, by all users for all documents (documents "i") for a particular query ("Q") that describes the total number of clicks by all users regardless or population on documents associated with a search query "Q." For example, the population processor 138 determines a sum which reflects some or all user clicks from all users regardless of population on documents returned in response to a prior search for a search query "Q." The sum can then be applied by the search engine 124 or population processor 138 to a population signal function or to set of computer-executable instructions. Note that the number of selections determined in block 314 is also summed by block 320 for all documents "i."

Block 320 is followed by block 322, in which a smoothing factor is determined. The search engine 124 determines a smoothing factor "μ" that reflects how much data is needed to trust a click signal such as user clicks from users from a particular population for a particular query. For example, the population processor 138 utilizes a predetermined equation or set of computer-executable instructions to determine the smoothing factor that accounts for how much data is needed to trust a click signal such as the user clicks from all users and from users from a particular population for a particular query. The smoothing factor can be particularly useful if there are very few user clicks from users of a particular population or if user clicks from a particular source is known or otherwise perceived not to be reliable or otherwise trustworthy. For example, as applied to the example for the query "Q" in the table above, since there is only a single click from users in Japan on document "D1" for the query "Q," the smoothing factor "μ" can be set to a constant value such as "10." In this case, the smoothing factor can be used to affect or otherwise influence the weight or value of the data associated with a particular population. In most instances, the smoothing factor is applied to a population signal function or to a set of computer-executable instructions processed by the population processor 138.

Note that in some instances, a general smoothing factor can be determined. The search engine 124 determines a general smoothing factor that reflects how much data is needed to trust a click signal such as user clicks by all users for a particular document for a particular query. In the example shown, an assumption is made that the amount of data needed to trust user clicks from the local population is the same as the amount of data needed to trust user clicks from the general population, and the smoothing factor as determined above can be used as the general smoothing factor.

By way of further example, a general smoothing factor can be determined as follows. The population processor 138 accesses the population database 120 or other data storage device to retrieve user click data. Using a predetermined equation or set of computer-executable instructions, the population processor 138 determines the number of user clicks by all for a particular document for a particular query.

If smoothing factors, values, or scores for a particular document for a particular query have previously been stored in the population database 120, the population processor 138 retrieves the smoothing factors, values, or scores for a particular query. For example, the population database 120 may indicate that there is an insufficient number of clicks from all users for a document in a search result for the search query "boating," and that the total number of clicks from all users for all documents in the search result for the search query "boating" should be used. A general population smoothing factor can gradually transition between the two results. A determination can be made whether to use the number of clicks from all users for a document in a search result for the search query "boating," or the total number of clicks from all users for all documents in the search result for the search query "boating" so that improved search results can be obtained from population information and selection data.

Block 322 is followed by block 324, in which a number of selections, in this case clicks, by all users for each document (document "j") returned in a search result for a particular query ("Q"). The search engine 124 determines the number of clicks for document "j" regardless of population when document "j" is returned in search results for query "Q." For example, the population processor 138 accesses population information stored by the population database 120 or other data storage devices as well as clickthrough data stored by the clickthrough database 122 or previously shared with the population database 120. The population processor 138 applies a predetermined equation or set of computer-executable instructions to some or all of the population information and clickthrough data to determine the number of clicks by a population on a document for a search query, also referred to as "#(q,d$_j$)." For example, if the query "Q" is "boating," then it can be determined that there were 101 total user clicks by all users on document "D$_1$" for query "Q."

Block 324 is followed by block 326, in which a number of selections, in this case clicks, by all users in a population "P" is determined for each document (document "j") returned in a search result for a particular query ("Q"). The search engine 124 determines the number of clicks by all users in a population "P" for document "j" when document "j" is returned in search results for query "Q." For example, the population processor 138 accesses population information stored by the population database 120 or other data storage devices as well as clickthrough data stored by the clickthrough database 122 or previously shared with the population database 120. The population processor 138 applies a predetermined equation or set of computer-executable instructions to some or all of the population information and clickthrough data to determine the number of clicks by a population on a document for a search query, also referred to as "#(q,d$_j$,P)." For example, if the query "Q" is "boating," then it can be determined that there were 20 total user clicks by all users in the population of France on document "D$_1$" for query "Q."

Block 326 is followed by block 328, in which a population signal for a document for a particular search query is determined. The search engine 124 determines a population signal 128 for a particular document in a search result 132. For example, the population processor 138 uses a number of factors such as the number of times a search query was asked by users of a particular population; the number of times a search query was asked by all users; the number of times a search query was asked and a particular document was clicked by users of a particular population; the number of times a search query was asked and a particular document was clicked by users of all populations; the number of times a document was clicked by users of a particular population for any search query; the number of times a document was clicked by all users for any search query; the smoothing factor, if needed; and the population click weight, if needed, to determine a population signal 128 for a particular document in a search result.

In the embodiment shown, this population signal 128 is calculated using the data determined in previous blocks 300-324 discussed and the algorithm shown in example (1). As applied to the prior example for the query "boating," the population processor 138 determines a population signal 128 for a particular document in a search result 132. As represented by "S(Q,D$_j$)" in the population signal function as shown above in subroutine 212, a weighted value representing the weighted total number of user clicks on document "j" after counting clicks by users of a particular population "F" is determined by the population processor 138. This is carried out by performing the mathematical functions as indicated by the algorithm described above to calculate the S$_j$(Q,D$_j$)" for document "j."

Block 328 is followed by decision block 330, in which a decision is made whether all documents for a search query have been processed. The search engine 124 compares the counter or variable "j" initially set at a value of "1" in block 302 to the variable "M," which has been set to a value according to the number of documents to be processed for the search query. If all the documents have been processed, then the counter or variable "j" will equal the variable "M" and the "YES" branch is followed to block 332. In alternative embodiments, a maximum number of documents for analysis may be set. For example, "M" may be set to a maximum number that is less than the number of documents determined in block 302.

In block 332, the subroutine 212 ends.

If however in decision block 330, not all of the documents have been processed and the counter or variable "j" is not equal to the variable "M," then the "NO" branch is followed to block 334.

In block 334, a counter is incremented to track the number of documents that have been processed. For example, the counter or variable "j" initially set at a value of "1" is incremented to a next value such as "2." The subroutine 212 then returns to block 324 to continue processing the next document. Subsequent documents are processed by blocks 324-328, and the counter or variable "j" at block 334 is subsequently incremented until all of the documents are processed, and the value of the counter or variable "j" equals "M." Thus, in the example provided previously for "boating," all 15 documents of the search result for the search query "boating" would be processed by blocks 324-328.

When all of the documents have been processed, the "YES" branch is followed from decision block 332, and the subroutine 212 ends at block 332.

Referring again to FIG. 2, subroutine 212 is followed by block 214, in which the population signal for each document is provided to the ranking processor. For example, in the embodiment shown, the calculated score "S(Q,D$_j$)" for each document "1–N" would be included in "N" population signals. The population signal 128 for each document is transmitted to the ranking processor 136 for determining subsequent rankings or scores of search results in response to other search queries. The ranking processor 136 includes a ranking or scoring function or set of computer-executable instructions that incorporates the population signal 128 and/or other output from the population processor 138. For example, a weighted value generated from subroutine 212 is transmitted to the ranking processor 136, which utilizes a population signal 128 such as a weighted value to rank or otherwise score subsequent search results. Other signals 130 generated for each document by the search engine 124 or another system or method can also be transmitted to the ranking processor 136 to rank or score subsequent search results.

Block 214 is followed by block 216, in which search results are provided. The ranking processor 136 generates a ranking or scoring of each document located in a search result 132 in response to a search query 114. Using the population signal 128 from block 214, such as a weighted value, the ranking processor 136 affects the ranking or scoring of one or more documents located in a search result 132. Note that the ranking processor 136 can use other signals such as those shown in FIG. 1 as 130 in conjunction with the population signal 128 to rank or otherwise score documents of a search result 132. In some instances, the ranking processor 136 can further decide whether to utilize a particular population signal 128 and/or other signals 130 during processing of a score or ranking for a search result 132.

Block 216 is followed by block 218, in which the method 200 ends.

In other embodiments of the invention, the method 200 can be utilized in an iterative manner to determine a new or updated population signal whenever new or changes to data in the population database 120 and/or clickthrough database 122 or other data storage devices is received or otherwise obtained. When a new or updated population signal is determined, the signal can then be transmitted to the ranking processor 136 to change or to update the ranking or scores for a search result 132.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A computer-implemented method, comprising:
    receiving, at a server device and from a client device, a search query entered on the client device by a user;
    determining, using the server device, that the user belongs to at least a first population group;
    determining, using the server device, that at least a first article is responsive to the search query;
    determining, using the server device, an interest value reflecting an interest of the first population group in the first article, the interest value based on at least one selection of the first article made when the first article was previously presented to at least one member of the first population group in response to an earlier search query identical to the search query;

determining, using the server device, a first ranking score for the first article, the first ranking score based at least in part on the interest value; and outputting a search result from the server device to the client device in response to the search query, the first article ranked in the search result according to the first ranking score.

2. The method of claim 1, wherein determining that the user belongs to the first population group comprises determining, using the server device, demographic data associated with the user.

3. The method of claim 2, wherein determining the demographic data comprises determining, using the server device, a likely geographic location for the user.

4. The method of claim 3, wherein determining the likely geographic location for the user comprises determining, using the server device, at least one of the following: an Internet Protocol address from which the search query was sent; an address input by the user to access a search engine; and demographic data input by the user.

5. The method of claim 2, wherein determining the demographic data comprises determining, using the server device, a least one of the following: age, age range, sex, race, primary language, secondary language, location, income, income range, a continent, a region, a country, a state, a county, a city, a gender, an ethnic group, a group, persons with a shared characteristic, persons with a shared interest, persons grouped by a predetermined selection, and internet service provider data.

6. The method of claim 2, wherein determining the demographic data comprises at least one of the following: determining, using the server device, a language of the search query; and determining, using the server device, data associated with previous senders of the search query.

7. The method of claim 1, wherein determining that the user belongs to the first population group comprises determining, using the server device, self-identification data associated with the user.

8. The method of claim 7, wherein the self-identification data is selected from at least one of the following: user registration data, user preference data, and user selected data.

9. The method of claim 1, wherein determining that the user belongs to the first population group comprises determining, using the server device, automatic-identification data associated with the user.

10. The method of claim 9, wherein the automatic-identification data comprises at least one of the following: an IP address, a domain, and default data obtained by an application associated with the user.

11. The method of claim 1, wherein the interest value comprises a selection score for the first article in a context of the first population group.

12. The method of claim 11, wherein the selection score for the first article in the context of the first population group comprises a number of clicks for the first article by members of the first population group for the search query.

13. The method of claim 11, wherein the interest value comprises at least the selection score divided by at least a total selection score for a set of documents provided in response to the search query, the total selection score corresponding to how many clicks users in the first population group made on any of the set of documents.

14. The method of claim 13, wherein the interest value comprises a smoothing factor associated with the clicks.

15. The method of claim 1, wherein the interest value comprises a number of members of the first population group that selected any article returned for the search query.

16. The method of claim 1, wherein the interest value comprises a number of members of the first population group that input the search query.

17. The method of claim 1, wherein the interest value comprises a total selection score.

18. The method of claim 17, wherein the total selection score comprises a total number of members of the first population group that selected the first article.

19. The method of claim 1, further comprising determining, using the server device, that the user also belongs to at least a second population group, wherein the interest value is determined so that it also reflects an interest of the second population group in the first article.

20. The method of claim 1, further comprising
determining, using the server device, that also at least a second article is responsive to the search query;
determining, using the server device, another interest value reflecting an interest of the firs population group in the second article; and
determining, using the server device, a second ranking score for the second article, the second ranking score based at least in part on the other interest value, wherein the second article is ranked in the search result according to the second ranking score.

21. The method of claim 1, wherein the interest value is based at least in part on a total selection score, a selection score based at least in part on the first population group, a smoothing factor, a number of times a query was input by members of the first population group, and a number of times a query was input.

22. A computer-readable medium containing program code, comprising:
first program code for receiving, at a server device and from a client device, a search query entered on the client device by a user;
second program code for determining, using the server device, that the user belongs to at least a first population group;
third program code for determining, using the server device, that at least a first article is responsive to the search query;
fourth program code for determining, using the server device, an interest value reflecting an interest of the first population group in the first article, the interest value based on at least one selection of the first article made when the first article was previously presented to at least one member of the first population group in response to an earlier search query identical to the search query;
fifth program code for determining, using the server device, a first ranking score for the first article, the first ranking score based at least in part on the interest value; and
sixth program code for outputting a search result from the server device to the client device in response to the search query, the first article ranked in the search result according to the first ranking score.

23. A system comprising:
at least one processor; and
a computer-readable medium containing program code that when executed cause the at least one processor to perform operations comprising:
receiving, at a server device and from a client device, a search query entered on the client device by a user;

determining, using the server device, that the user belongs to at least a first population group;

determining, using the server device, that at least a first article is responsive to the search query;

determining, using the server device, an interest value reflecting an interest of the first population group in the first article, the interest value based on at least one selection of the first article made when the first article was previously presented to at least one member of the first population group in response to an earlier search query identical to the search query;

determining, using the server device, a first ranking score for the first article, the first ranking score based at least in part on the interest value; and outputting a search result from the server device to the client device in response to the search query, the first article ranked in the search result according to the first ranking score.

24. The system of claim 23, wherein the interest value comprises a selection score for the first article in a context of the first population group.

25. The system of claim 24, wherein the selection score for the first article in the context of the first population group comprises a number of clicks for the first article by members of the first population group for the search query.

26. The system of claim 24, wherein the interest value comprises at least the selection score divided by at least a total selection score for a set of documents provided in response to the search query, the total selection score corresponding to how many clicks users in the first population group made on any of the set of documents.

27. The system of claim 26, wherein the interest value comprises a smoothing factor associated with the clicks.

28. The system of claim 23, wherein the interest value comprises a number of members of the first population group that selected any article returned for the search query.

29. The system of claim 23, wherein the interest value comprises a number of members of the first population group that input the search query.

30. The system of claim 23, wherein the interest value comprises a total selection score.

31. The system of claim 30, wherein the total selection score comprises a total number of members of the first population group that selected the first article.

32. The system of claim 23, wherein determining that the user belongs to the first population group comprises determining, using the server device, demographic data associated with the user.

33. The system of claim 32, wherein determining the demographic data comprises determining, using the server device, a likely geographic location for the user.

34. The system of claim 33, wherein determining the likely geographic location for the user comprises determining, using the server device, at least one of the following: an Internet Protocol address from which the search query was sent; an address input by the user to access a search engine; and demographic data input by the user.

35. The system of claim 32, wherein determining the demographic data comprises determining, using the server device, at least one of the following: age, age range, sex, race, primary language, secondary language, location, income, income range, a continent, a region, a country, a state, a county, a city, a gender, an ethnic group, a group, persons with a shared characteristic, persons with a shared interest, persons grouped by a predetermined selection, and internet service provider data.

36. The system of claim 32, wherein determining the demographic data comprises at least one of the following: determining, using the server device, a language of the search query; and determining, using the server device, data associated with previous senders of the search query.

37. The system of claim 23, wherein determining that the user belongs to the first population group comprises determining, using the server device, self-identification data associated with the user.

38. The system of claim 37, wherein the self-identification data is selected from at least one of the following: user registration data, user preference data, and user selected data.

39. The system of claim 23, wherein determining that the user belongs to the first population group comprises determining, using the server device, automatic-identification data associated with the user.

40. The system of claim 39, wherein the automatic-identification data comprises at least one of the following: an IP address, a domain, and default data obtained by an application associated with the user.

41. The system of claim 23, further comprising determining, using the server device, that the user also belongs to at least a second population group, wherein the interest value is determined so that it also reflects an interest of the second population group in the first article.

42. The system of claim 23, further comprising
determining, using the server device, that also at least a second article is responsive to the search query;
determining, using the server device, another interest value reflecting an interest of the firs population group in the second article; and
determining, using the server device, a second ranking score for the second article, the second ranking score based at least in part on the other interest value, wherein the second article is ranked in the search result according to the second ranking score.

43. The system of claim 23, wherein the interest value is based at least in part on a total selection score, a selection score based at least in part on the first population group, a smoothing factor, a number of times a query was input by members of the first population group, and a number of times a query was input.

* * * * *

UNITED STATES PATENT AND TRADEMARK OFFICE
CERTIFICATE OF CORRECTION

Page 1 of 1

PATENT NO.         : 8,090,713 B2
APPLICATION NO.    : 12/273449
DATED              : January 3, 2012
INVENTOR(S)        : Simon Tong and Mark Pearson It is certified that error appears in the above-identified patent and that said Letters Patent is hereby corrected as shown below:

On the Title Page, Item (56), Line 2, Delete "Camegie" and insert -- Carnegie --, therefor.

Column 21, Line 26 (Claim 5), delete "a least" and insert -- at least --, therefor.

Column 22, Line 22 (Claim 20), delete "firs" and insert -- first --, therefor.

Column 24, Line 41 (Claim 42), delete "firs" and insert -- first --, therefor.

Signed and Sealed this
Twenty-seventh Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,090,713 B2 | Page 1 of 1 |
| APPLICATION NO. | : 12/273449 | |
| DATED | : January 3, 2012 | |
| INVENTOR(S) | : Tong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this
Twenty-second Day of May, 2012

David J. Kappos
*Director of the United States Patent and Trademark Office*